April 5, 1966 K. E. LÖHNER 3,244,154
CIRCULAR PISTON DIESEL ENGINE
Filed Aug. 16, 1963 2 Sheets-Sheet 1
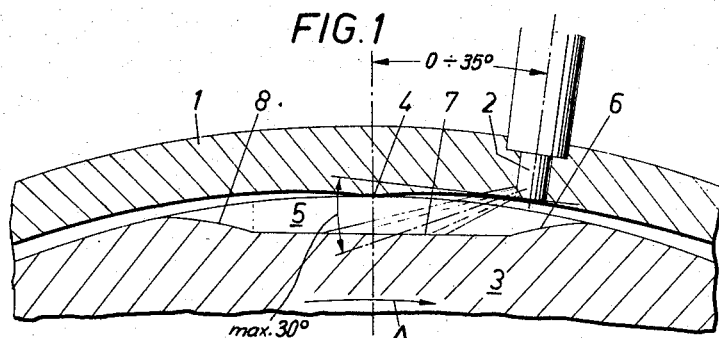
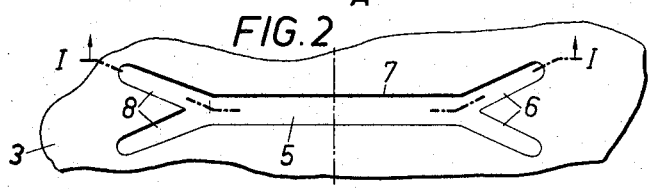
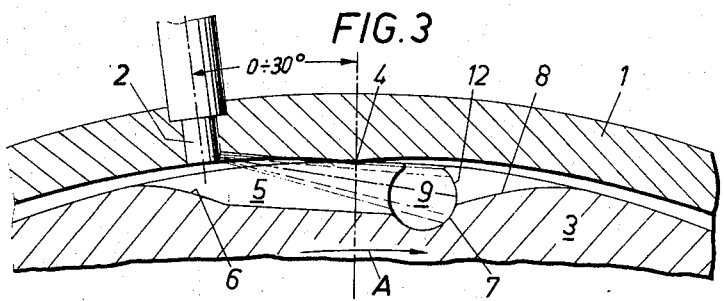
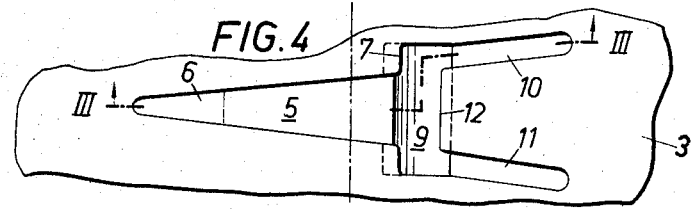

April 5, 1966  K. E. LÖHNER  3,244,154
CIRCULAR PISTON DIESEL ENGINE
Filed Aug. 16, 1963  2 Sheets-Sheet 2

United States Patent Office 3,244,154
Patented Apr. 5, 1966

3,244,154
CIRCULAR PISTON DIESEL ENGINE
Kurt E. Löhner, Braunschweig, Germany, assignor to Beteiligungs- und Patentverwaltungsgesellschaft mit beschränkter Haftung, Essen, Germany
Filed Aug. 16, 1963, Ser. No. 302,651
Claims priority, application Germany, Aug. 25, 1962, B 68,566
9 Claims. (Cl. 123—8)

The present invention relates to a circular piston diesel engine with an injection nozzle arranged in the engine housing in such a way that the direction of injection of said nozzle together with the tangent to the inner contour of said housing confines an angle of not in excess of 30° while a groove-like recess is arranged in the peripheral surface of the rotor of said engine.

In view of the relatively long combustion chamber which is formed by said peripheral recess and the respective adjacent inner contour surface of the engine housing, it is rather difficult, with this type of engine, to produce, prepare and distribute the mixture in the manner required for a good combustion.

It is, therefore, an object of the present invention to provide a circular piston diesel engine which will greatly reduce the said difficulty.

It is another object of this invention to provide a circular piston diesel engine which will permit the fuel jet, after leaving the nozzle, to develop and progress unimpededly and to be deviated in the manner of a wet steam jet only after the fuel jet has been broken up into fine particles and has partially evaporated while having travelled over a certain distance.

It is still another object of this invention to provide a circular piston diesel engine which will assure a thorough turbulence of the fuel jet and a thorough intermixture with the combustion air.

A further object of this invention consists in a circular piston diesel engine of the type set forth in the preceding paragraphs, which will assure a good distribution of the fuel air mixture over a portion of the combustion chamber.

These and other objects and advantages of the invention will appear more clearly from the following specification in connection with the accompanying drawings, in which:

FIGURE 1 illustrates in section a portion of a circular piston diesel engine according to the invention, and in particular shows the recess in the peripheral area of the rotor which recess serves as combustion chamber;

FIGURE 2 is a top view of the combustion chamber recess shown in FIGURE 1;

FIGURE 3 is a section similar to FIGURE 1 but shows a modification according to which the central portion of the recess is provided with a cylindrical section;

FIGURE 4 shows a top view of the combustion chamber forming recess of FIGURE 3;

Figure 5:
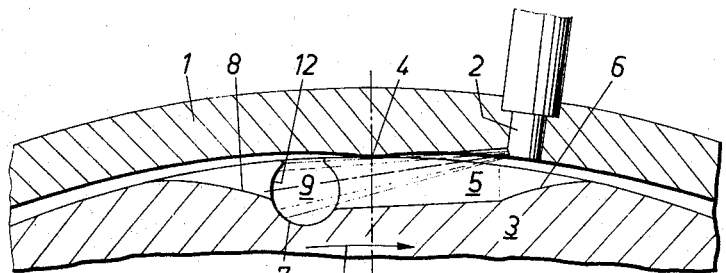
FIGURE 5 is a section similar to that of FIGURE 3 but showing the arrangement of FIGURE 3 as an image thereof.

The present invention is characterized primarily in that the bottom of a groove-shaped recess in the rotor, which recess forms a part of the combustion chamber, comprises three surface sections arranged one behind the other when looking in the direction of injection of the fuel fluid from a nozzle. Of these three surface sections, the first one which, at the start of the injection is at least partially radially located with regard to the injection nozzle, is so inclined with regard to the direction of injection that said first surface will just be skipped by the fuel jet. The next succeeding surface section (in the direction of injection) is so arranged and inclined with regard to the direction of injection that the fuel jet will, at least during the major portion of the injection period, be deviated thereby in such a way that it will just fail to moisten the third surface section. In this way, the fuel jet will, after leaving the nozzle mouth, be able first to develop and proceed in an unimpeded manner, and only at a certain distance from the nozzle mouth, when the fuel jet has broken up into fine particles and has partially evaporated, will be deviated in the manner of a wet steam jet.

Accordingly, it is suggested that the recess will broaden within the range of the first surface section, in conformity with the opening of the fuel jet in the direction of injection.

Referring now to the drawing in detail, the portion shown therein of a rotary piston diesel engine comprises a housing 1 with an injection nozzle 2 for injecting a fuel fluid into a combustion chamber confined by the housing 1 and the rotor 3. The mouth of the injection nozzle 2 is located in the vicinity of a saddle formation 4 on the inner contour surface of the housing 1 and, when the rotor occupies a position corresponding to a maximum compression, is located over one end portion of the combustion chamber formed by a groove-shaped recess 5 provided in rotor 3 and by the adjacent inner contour surface of the housing 1 with the saddle formation 4. The groove-shaped recess 5 comprises a bottom having three surface sections 6, 7 and 8, respectively. These three surface sections are arranged one behind the other when looking in the direction of injection. The first bottom surface section 6 is located radially with regard to the injection nozzle 2 and is so inclined that the fuel jet will just skip the same. The fuel jet is deviated by the second surface section 7 in such a way that it will just fail to moisten the third surface section 8. The said third surface section 8 substantially forms an image of the surface section 6 and is located symmetrically thereto with regard to the transverse plane of symmetry of said recess 5.

According to the embodiment shown in FIGS. 1 and 2, the injection nozzle is arranged within a range of from 0 to 35° of the sector angle behind the saddle formation 4 when looking in the direction A of rotation of rotor 3.

In the arrangement shown in FIG. 1 the direction of injection is counter to the direction of rotation of the rotor. The recess 5 has within the range of the first and third surface sections two converging and two diverging branches, respectively, when looking in the direction of injection. In order, in addition to the deviating effect on the second surface section, to obtain within the range of said second surface section a good turbulence of the fuel jet and a good intermixture with the combustion air, it is advantageous to provide the second surface section with a cylindrical combustion chamber portion in such a way that the axis of said cylindrical combustion chamber portion is substantially parallel to the axis of rotation of the rotor. This cylindrical combustion chamber portion is shown in the embodiment of FIG. 3 and designated with the reference numeral 9. In this connection, it is advantageous to design the recess within the range of the third surface section as two branches starting within the range of the second surface section and extending adjacent each other and spaced from each other by a distance preferably corresponding to the width of the non-deviated fuel jet. Thus, as shown in particular in FIG. 4, two branches 10 and 11 the bottoms of which form the third surface section branch branch off the cylindrical combustion chamber portion 9 which latter has its axis substantially parallel to the axis of rotation of the rotor. In order to prevent the fuel jet which passes over the first surface section 6 from directly penetrating to the third surface section 8, the two branches 10 and 11 of recess 5 are spaced from each other by a distance corresponding to the width of the non-deviated fuel jet portion. Between the two branches 10 and 11 at the start thereof, the wall of the cylindrical fuel combustion chamber portion 9 extends upwardly to the original height of the rotor contour. It is at this portion 12 of the wall of the cylindrical combustion chamber portion 9 that the fuel jet is deviated and subjected to turbulence. Within the range of the first surface section 6, the recess widens in conformity with the opening of the fuel jet in the direction of injection.

By the flow obtained in the above-mentioned manner also in the direction of the axis of the cylindrical combustion chamber portion 9, the forming fuel-air mixture will be well distributed over the entire cylindrical combustion chamber portion. The formation of a cyclon-like flow in this combustion chamber portion can be increased by a corresponding design of the merging portions from the first to the second surface section, and from the second to the third surface section.

In addition thereto, the flow velocity within the range of the second surface section may well be influenced by so designing the recess that the starting and/or end portion within the range of the first and/or third surface section is formed by two parts converging and diverging in the direction of injection.

Figure 6:
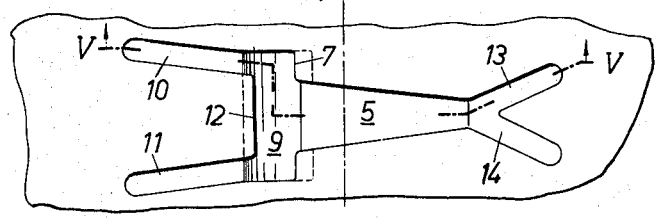
FIGURE 6 is a top view of the combustion chamber forming recess of FIGURE 5.

While with the embodiment of FIGS. 3 and 4, the direction of injection is in the direction of rotation of the rotor (see arrow A indicating the direction of rotation of the rotor), with the embodiment of FIGS. 5 and 6, the direction of injection is counter to the direction of rotation of the rotor. In the last-mentioned instance, the recess 5 has also within the range of the first surface section, its front portion formed by two converging portions 13 and 14.

Figure 7:
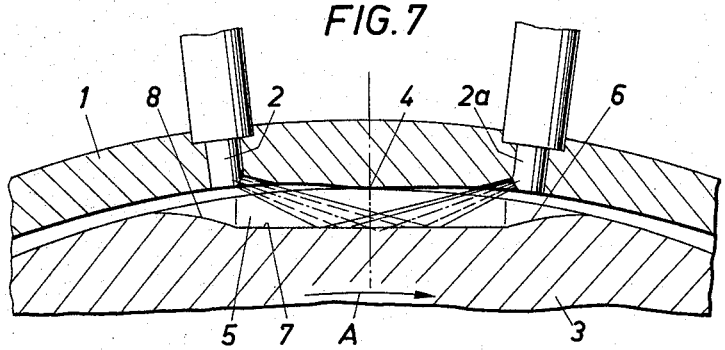
FIGURE 7 is a section similar to FIGURE 1 but shows a modification according to which two nozzle means are provided injecting the fuel jet in the direction of rotation of the rotor and also in a direction counter to the direction of rotation of the rotor, respectively.

The above-mentioned features are advantageously applicable when according to FIG. 7 the fuel jet is injected in the direction of rotation of the rotor and also in a direction counter to the direction of rotation of the rotor, respectively. However, when injecting in the direction of rotation of the rotor, the mouth of the injection nozzle 2 is advantageously located within a range of from 0 to 30° of the sector angle behind the saddle formation 4, whereas, when the injection is effected in a direction counter to the direction of rotation of the rotor, the mouth of the nozzle 2a is located within a range of from 0 to 35° of the sector angle ahead of the said saddle formation 4.

Figure 8:
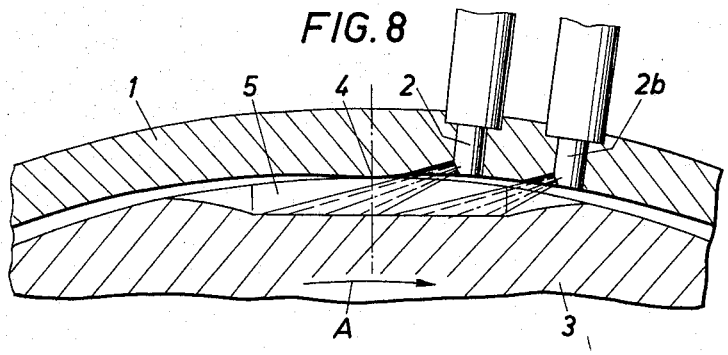
FIGURE 8 is a section similar to FIGURE 1 but shows a modification according to which two nozzle means are arranged one behind the other when looking in the direction counter to the direction of rotation of the rotor.

Under certain circumstances, an arrangement may be advantageous according to which a plurality of injection nozzles 2, 2b are provided which, as shown in FIG. 8, may inject in the direction counter to the direction of rotation of the rotor. When, for instance, with a triangular outer contour of a rotor, that position of the rotor is designated as the upper dead center position of the rotor in which the central portion between two edges is precisely opposite to the saddle formation 4 of the inner housing contour in the combustion chamber the total length of the recess extends, according to the present invention, over a range of 35° of the sector angle ahead of the upper dead center point to 35° of said sector angle behind said upper dead center point.

It is, of course, to be understood that the present invention is, by no means, limited to the particular constructions shown in the drawing, but also comprises any modifications within the scope of the appended claims.

What I claim is:

1. In a circular piston diesel engine: a housing having an inner arched contour surface, fuel injection nozzle means mounted in said housing, the axis of the mouth of said fuel nozzle means with the tangent to said inner contour surface at said nozzle means confining an angle of a maximum of 30°, a rotor rotatably arranged within said contour surface and having a peripheral recess confining with adjacent surface portions of said contour surface a combustion chamber movable by said injection nozzle means, said combustion chamber having a bottom surface comprising a first and a second and a third bottom surface section arranged in said sequence one behind the other when looking in the fuel injection direction from said nozzle means, said first bottom surface section at the start of the fuel injection by said nozzle means being located at least partially radially with regard to said nozzle means and being so inclined with regard to the axis of the nozzle mouth and thereby the axis of the fuel jet leaving said nozzle mouth that said first bottom surface will just be skipped by the fuel injection jet leaving said nozzle means whereas said second bottom surface section is so arranged and inclined with regard to the axis of the mouth of said nozzle means and thereby with regard to the fuel injection jet leaving said mouth that said fuel injection jet will at least during the major portion of the fuel injection period be so deviated by said second bottom surface section that it will just fail to moisten said third bottom surface section.

2. A circular piston diesel engine according to claim 1, in which said recess within the range of said first bottom section widens in conformity with the opening angle of said nozzle mouth and thereby in conformity with the opening of the fuel jet in the direction of injection of the latter.

3. A rotary piston diesel engine according to claim 1, in which a plurality of nozzle means are provided injecting the fuel jet in the direction of rotation of the rotor and also in a direction counter to the direction of rotation of the rotor, respectively.

4. A rotary piston diesel engine according to claim 1, in which a plurality of nozzle means are arranged one behind the other in the direction of fuel injection thereof.

5. In a circular piston diesel engine: a housing having an inner arched contour surface, fuel injection nozzle means mounted in said housing, the axis of the mouth of said fuel nozzle means with the tangent to said inner contour surface at said nozzle mouth confining an angle of a maximum of 30°, a rotor rotatably arranged within said contour surface and having a peripheral recess confining with adjacent surface portions of said contour surface a combustion chamber movable by said injection nozzle means, said combustion chamber having a bottom surface comprising a first and a second and a third bottom surface section arranged in said sequence one behind the other when looking in the fuel injection direction from said nozzle means, said first bottom surface section at the start of the fuel injection by said nozzle means being located at least partially radially with regard to said nozzle means and being so inclined with regard to the axis of the nozzle mouth and thereby the axis of the fuel jet leaving said nozzle mouth that said first bottom surface will just be skipped by the fuel injection jet leaving said nozzle means whereas said second bottom surface section is so arranged and inclined with regard to the axis of the mouth of said nozzle means and thereby with regard to the fuel injection jet leaving said mouth that said fuel injection jet will at least during the major portion of the fuel injection period be so deviated by said second bottom surface section that it will just fail to moisten said third bottom surface section, said recess within the range of said second bottom section being provided with a substantially cylindrical fuel chamber section having its axis substantially parallel to the axis of rotation of said rotor.

6. In a circular piston diesel engine: a housing having an inner arched contour surface, fuel injection nozzle means mounted in said housing, the axis of the mouth of said fuel nozzle means with the tangent to said inner contour surface at said nozzle means confining an angle of a maximum of 30°, a rotor rotatably arranged within said contour surface and having a peripheral recess confining with adjacent surface portions of said contour surface a combustion chamber movable by said injection nozzle means, said combustion chamber having a bottom surface comprising a first and a second and a third bottom surface section arranged in said sequence one behind the other when looking in the fuel injection direction from said nozzle means, said first bottom surface section at the start of the fuel injection by said nozzle means being located at least partially radially with regard to said nozzle means and being so inclined with regard to the axis of the nozzle mouth and thereby the axis of the fuel jet leaving said nozzle mouth that said first bottom surface will just be skipped by the fuel injection jet leaving said nozzle means whereas said second bottom surface section is so arranged and inclined with regard to the axis of the mouth of said nozzle means and thereby with regard to the fuel injection jet leaving said mouth that said fuel injection jet will at least during the major portion of the fuel injection period be so deviated by said second bottom surface section that it will just fail to moisten said third bottom surface section, said third bottom section comprising two branch portions branching off from said second bottom section and spaced from each other by approximately the width of the non-deviated fuel jet at said third section.

7. In a circular piston diesel engine: a housing having an inner arched contour surface, fuel injection nozzle means mounted in said housing, the axis of the mouth of said fuel nozzle means with the tangent to said inner contour surface at said nozzle means confining an angle of a maximum of 30°, a rotor rotatably arranged within said contour surface and having a peripheral recess confining with adjacent surface portions of said contour surface a combustion chamber movable by said injection nozzle means, said combustion chamber having a bottom surface comprising two end surface sections and an intermediate surface section between the said two end surface sections, said surface sections being arranged one behind the other when looking in the fuel injection direction from said nozzle means, at least one of said end bottom sections having two arms diverging in a direction away from said intermediate bottom section, that one of said end bottom sections which is adjacent said nozzle means being located at least partially radially with regard to said nozzle means during a portion of the injection period and being so inclined with regard to the axis of the mouth of said nozzle means and thereby with regard to the direction of injection by said nozzle means that that bottom end portion which is adjacent said nozzle means will just be skipped by the fuel injection jet leaving said nozzle means whereas said intermediate bottom surface section is so arranged and inclined with regard to the axis of the mouth of said nozzle means and thereby with regard to the fuel injection jet leaving said mouth that said intermediate bottom section will at least during the major portion of the fuel injection period be so deviated by said intermediate bottom section that it will just fail to moisten that bottom end section which is remote from said nozzle means.

8. A circular piston diesel engine according to claim 7, in which the inner contour surface of said housing is provided with a saddle formation near the mouth of said nozzle means while said mouth is directed for injection in the direction of rotation of said rotor, and in which said mouth is located within a range of from 0 to 30° of the sector angle confined by the axis of said nozzle and the plane of symmetry extending through and substantially perpendicularly to said saddle formation and also passing through the axis of rotation of said rotor, said angle being located behind said plane of symmetry when looking in the direction of rotation of said rotor.

9. A circular piston diesel engine according to claim 7, in which the inner contour surface of said housing is provided with a saddle formation near the mouth of said nozzle means while said mouth is directed for injection counter to the direction of rotation of said rotor, and in which said mouth is located within a range of from 0 to 35° of the sector angle confined by the axis of said nozzle and the plane of symmetry extending through and substantially perpendicularly to said saddle formation and also passing through the axis of rotation of said rotor, said angle being located ahead of said plane of symmetry when looking in the direction of rotation of said rotor.

No references cited.

SAMUEL LEVINE, *Primary Examiner.*